March 8, 1949. H. Z. STEWART 2,463,918
MACHINE FOR SHELLING PEAS AND BEANS
Filed March 28, 1946 2 Sheets-Sheet 1
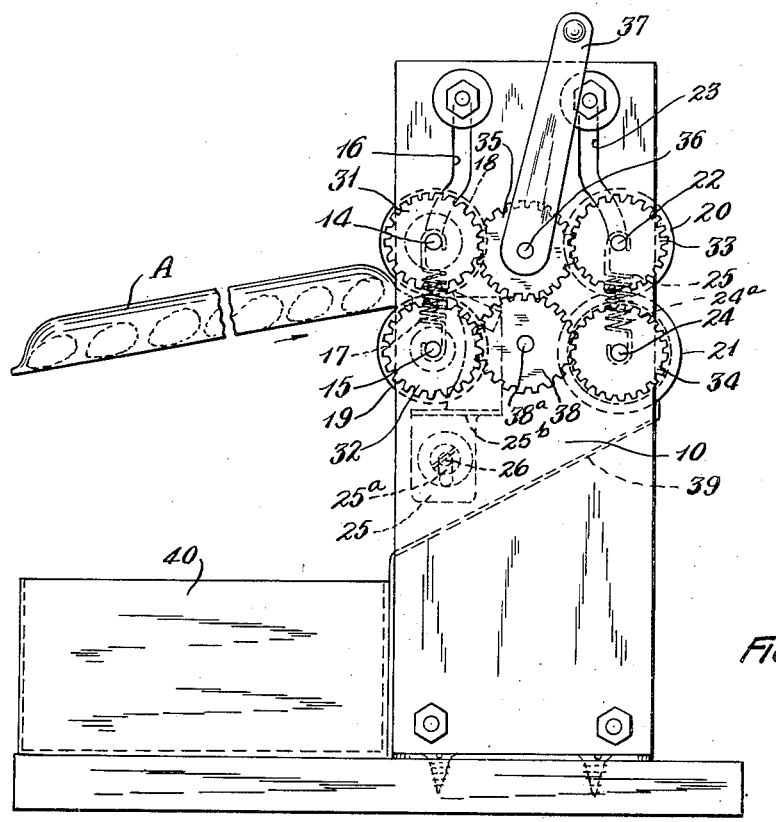
FIG. 1
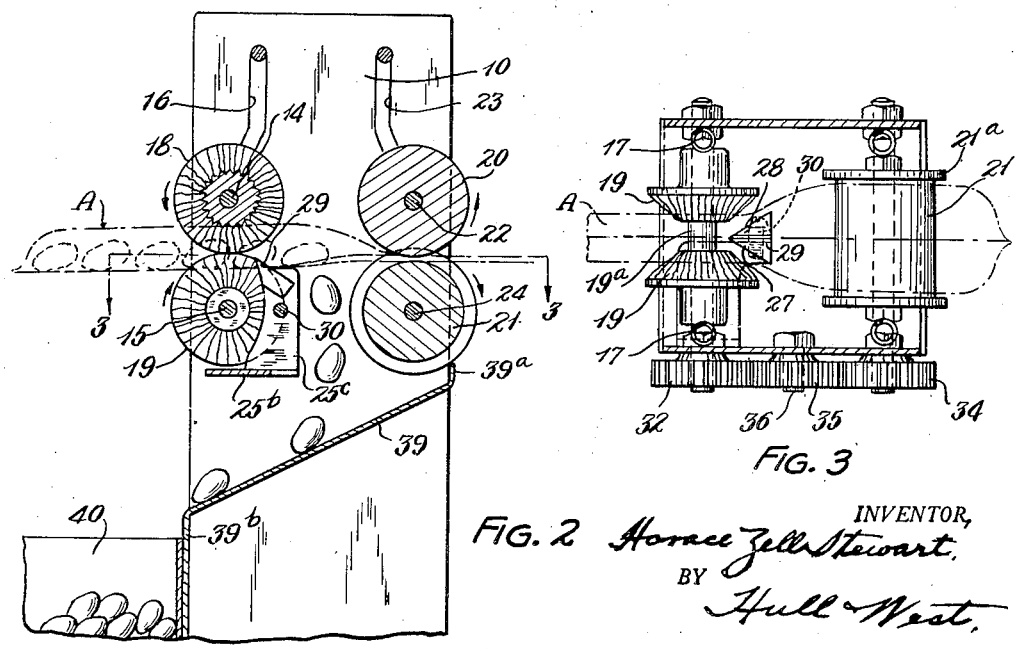
FIG. 2
FIG. 3
INVENTOR,
Horace Zell Stewart,
BY
Hull West,
ATTORNEYS March 8, 1949.  H. Z. STEWART  2,463,918
MACHINE FOR SHELLING PEAS AND BEANS Filed March 28, 1946  2 Sheets-Sheet 2

INVENTOR,
Horace Zell Stewart
BY Hull & West
ATTORNEYS

Patented Mar. 8, 1949

2,463,918

UNITED STATES PATENT OFFICE 2,463,918

MACHINE FOR SHELLING PEAS AND BEANS

Horace Zell Stewart, Mobile, Ala.

Application March 28, 1946, Serial No. 657,750

4 Claims. (Cl. 130—30)

This invention relates to machines for shelling peas and beans and has for its general object to produce a machine for the purpose described which will enable peas and beans to be removed without injury from their pods; to enable this result to be accomplished both efficiently and expeditiously and by the use of simple and inexpensive mechanism. While susceptible of a wider range of application, the machine shown herein is particularly useful in connection with the shelling of tough-podded and elongated peas or beans, an instance of such being the "black-eyed pea" or cowpea; and it constitutes a modification of the machine shown, described and claimed in my Patent No. 2,374,466, issued April 24, 1945.

In the practice of my invention, the pea or bean is inserted within the sutures in a substantially vertical plane between front and rear pairs of upper and lower feed rolls, the front receiving rolls having surfaces which conform respectively more or less to what, for convenience of description, will be referred to hereinafter as the "top" and "bottom" surfaces of the pod. Peas and beans thus inserted are driven by these rolls so that their placentas will be brought into engagement with a knife which serves to split the pods along their placentas but without injuring the fruit attached thereto. By further movement of the feed rolls, the separated edges of the pods are progressively spread apart as the peas or beans are fed by the rolls, the fruit being removed from the pods and being conducted to a suitable collecting receptacle, as shown herein.

Figure 4:
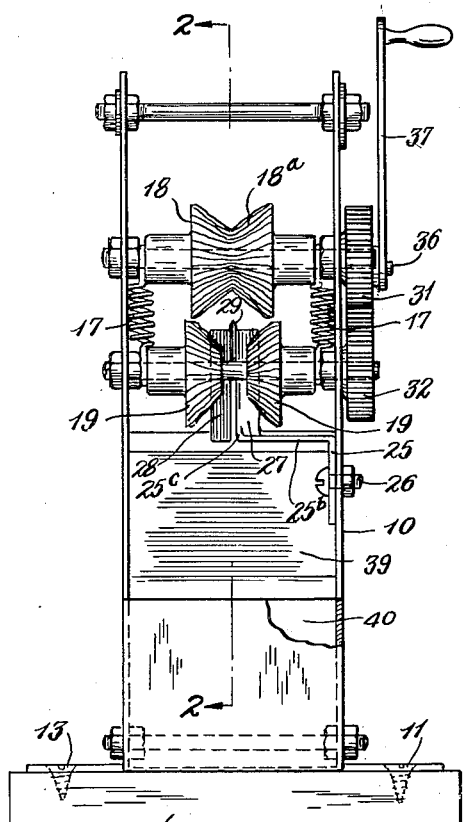

A construction of machine for realizing the objects of my invention is shown in the drawings hereof, wherein Fig. 1 represents a side elevational view of such machine, showing an elongated pea or bean being inserted between the receiving feed rolls; Fig. 2 a sectional view taken on the line 2—2 of Fig. 4 and looking in the direction of the arrows; Fig. 3 a sectional view taken on the line 3—3 of Fig. 2 and looking in the direction of the arrows; Fig. 4 a front elevational view, and Fig. 5 a rear elevational view, of the machine shown in Fig. 1; and Fig. 6 a detail in elevation illustrating the manner in which a pea or bean introduced into my machine is slit along its lower center or placenta by means of a knife and also illustrating the manner in which the sides of the pod are spread apart after the splitting operation, thereby to assist in freeing the fruit.

Describing, by reference characters, the parts shown in the aforesaid drawings, 10 denotes opposed side members of my machine, the same being shown as provided with base extensions 11 mounted upon a suitable base support 12 and secured thereto, as by screws 13. Mounted in what will be referred to hereinafter as the "front" of the side members are vertically aligned upper and lower shafts 14 and 15, the shaft 14 being journaled in upwardly extending slotted guides 16, and the said shafts being connected adjacent to their ends by coiled springs 17. These shafts support the initial or receiving feed drive rolls 18 and 19 respectively.

The roll 18 is outwardly concave from the opposite ends 18ª toward the middle whereby its outer surface approximates that of an annular trough, the operating surface of the roll being roughened to facilitate its feeding action. The lower roll 19 is made up of two sections each diminishing in width or diameter from its exterior toward its interior, a space 19ª being provided between the inner ends of said sections.

Figure 5:
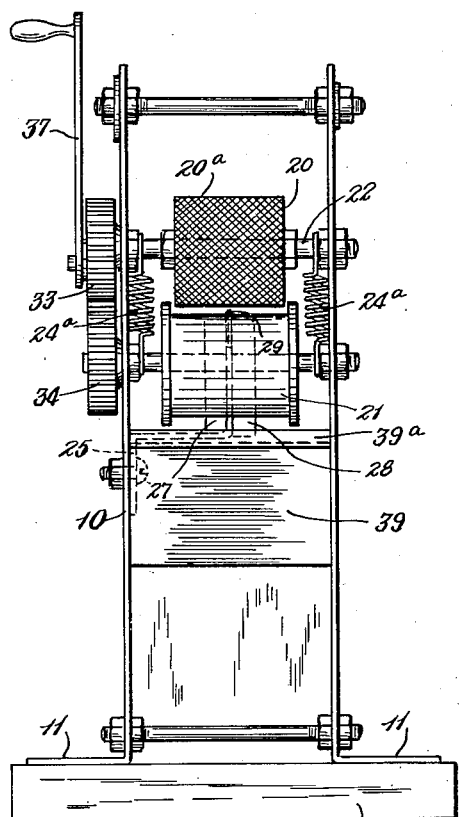
Figure 6:
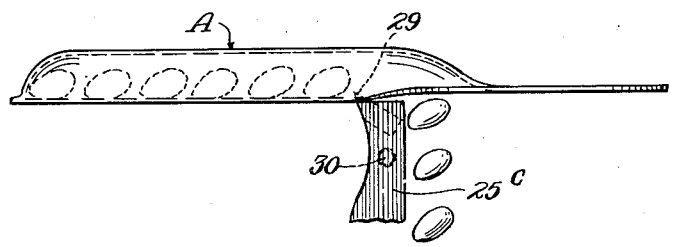

20 denotes generally an upper delivery drive roll preferably cylindrical, as shown, and the surface of which is preferably roughened, as shown at 20ª in Fig. 5, to facilitate the feeding and delivery of the pods.

Cooperating with the roll 20 is a lower delivery feed roll 21, which is also cylindrical and provided at its ends with circular disks 21ª of greater diameter than the diameter of roll 21, the length of the latter roll being such as to enable the lower portion of the roll 20 to be received between the said disks.

The roll 20 is mounted upon a shaft 22, the ends of which are journaled in upwardly extending slotted guides 23 in the side members 10, and the roll 21 is mounted upon a shaft 24 arranged vertically beneath the shaft 22 and the ends of which are journaled in the side members 10. Coiled springs 24ª connect the end portions of the shafts 22 and 24.

25 denotes the base of a bracket which is adjustably secured, as by means of a bolt 26 extending through an opening provided therefor in one of the side members 10 and through a vertical slot 25ª in said base. The bracket is bent inwardly from the top of said base, as shown at 25ᵇ and extends to substantially the center of the space between the said side members, whence it is bent upwardly, as shown at 25ᶜ, the upwardly extending portion being located rearwardly of but adjacent to the center of the space between the roll sections 19 and having secured thereto, as by welding or brazing, one of the vertically extending knife members 27 between which and the cooperating knife member 28 a blade member 29 is supported with its upper edge extending upwardly and forwardly toward the rear of the said space, the members 27 and 28 being connected by means of a short screw bolt 30 extending through the said members, preferably beneath the bottom of the blade 29, whereby the said members are clamped together and against the blade 29, which is inserted between the upper ends of the said members. When these members 27 and 28 are thus clamped together by the screw bolt 30, the front and forward edge of the blade projects forwardly beyond the said members and is located somewhat above the same.

It will be noted, by reference to Fig. 3 in particular, that the upper ends of the knife members 27, 28 are jointly of substantially V-shape, forming a forwardly extending V-shaped deflector by which the placenta of a pod which has been split by the blade 29 will be spread outwardly and in a condition to be received between and flattened out by the rolls 20 and 21. The blade is so positioned with reference to the axial center of the lower receiving roll sections 19 as to cut through the placenta on the pod of a pea or bean which is inserted between these roll sections and the roll 18 but without severing the fruit which it detaches from the placenta while the members 27 and 28 are also located so that they enter the slit made in the bottom of the pod by the blade and thus impart a preliminary spreading apart of the bottoms of the sides of the pod before the sides are received between the rolls 20 and 21. In practice, a piece of a discarded razor blade can be utilized as a knife blade. The manner of mounting the blade enables me to adjust it with the precision necessary to enable it to perform its function in an efficient manner.

The shafts 14 and 15 are provided each at an outer end thereof with a gear 31, 32, respectively, and the shafts 22 and 24 are provided at corresponding ends with gears 33 and 34, respectively. 35 denotes a gear mounted on a shaft 36 supported by one of the side members 10, the said gear being located between the gears 31 and 33 and meshing therewith and the shaft 36 being provided with an operating arm or lever 37. 38 denotes a lower gear which is mounted on a shaft 38ª supported by the side member 10 which supports the shaft 36 and which gear 38 is located intermediate of the gears 32 and 34 and which meshes therewith and with the gear 35.

With the parts constructed and arranged as described, the operation will be as follows: One end of a pea or bean (indicated at A) is inserted into the space provided between the rolls 18 and 19, with the placenta directed downwardly. The operator then rotates the gear 35 by means of the arm 37, which causes the rolls 18 and 19 to drive the pea or bean inwardly with the placenta in engagement with the blade 29, thereby splitting the pea or bean along its placenta, while the members 27 and 28 spread the bottoms of the sides outwardly. Further movement of the pea or bean causes the end portions of the sides of the pod which has been slit to pass between the rolls 20 and 21, the rolls serving not only to assist in driving the pea or bean through the machine, but also serving to spread the sides of the pod completely apart, as indicated in Figs. 2 and 3, and serving further to support successive portions of the sides of the pod in this outspread position, thereby preventing the blade from slicing the fruit. The fruit, having been dislodged from the pod, is delivered upon a forwardly and downwardly inclined distributing plate 39 which extends between it and is supported by the side members 10, the rear end of the said plate being bent upwardly, as shown at 39ª in proximity to the roll 21 and the front and lower ends of the said distributing plate being shown as extending downwardly at 39ᵇ. The fruit discharged from the pod of a pea or bean which has been operated upon in the manner described can be delivered by the said distributing plate into a suitable receptacle, indicated at 40.

The springs 17 and 25 serve to enable the upper and lower receiving and delivery drive rolls to be separated in the event that the pressure exerted between the upper and lower rolls should become excessive, as by inadvertent entry of a pebble or other foreign material therebetween.

From the foregoing, it will be noted that I have produced a machine which is capable of shelling peas or beans having elongated and tough pods and which is also capable of shelling peas or beans which vary greatly in length and which also may be misshapen. It will be evident further that I am enabled to accomplish this result with rapidity and efficiency.

Having thus described my invention, what I claim is:

1. In a machine of the character described, the combination of an upper and a lower receiving feed roll each having a concave surface intermediate of the ends thereof shaped to engage respectively the top and the bottom of the pod of a pea or bean inserted therebetween, an upper and a lower delivery feed roll spaced from the former feed rolls, a knife interposed and supported between the two pairs of rolls and comprising side members and a blade having its operating portion extending upwardly from the said side members, the upper portion of the side members forming jointly a forwardly projecting deflector of substantially V-shape and the upper ends of the said side members and the blade being located above the axis of rotation of the lower receiving feed roll and rearwardly of but adjacent to the central portion of said roll whereby the lower ends of the sides of the pod of a pea or bean passing between the upper and lower receiving feed rolls will be spread apart by said deflector after the placenta shall have been severed by the said blade, the delivery feed rolls being arranged to receive the sides of a pod which have been thus spread apart by the said deflector and to spread the same further apart whereby the peas or beans will be delivered from the pod between the receiving and delivery feed rolls; and means for driving the said rolls.

2. In the machine set forth in claim 1, the lower receiving feed roll comprising two symmetrical sections each of which diminishes in diameter from the end portion thereof toward the central portion thereof, the central portions of the said sections being axially spaced apart and the upper portion of the side members and the operating portion of the blade of the knife being positioned immediately adjacent the said sections, with the operating portion of the blade being located substantially midway between the said sections and extending at right angles to the axis thereof.

3. In a machine of the character described, the combination of opposed side members, an upper shaft and a lower shaft having their ends supported by the said side members, receiving feed rolls mounted on said shafts, the said rolls each diminishing in diameter from the end portions thereof toward the central portion thereof, an upper shaft and a lower shaft also having their ends supported by said side members and spaced laterally from the former shafts, a delivery feed roll on the upper of the last mentioned shafts, a delivery feed roll mounted on the lower of the last mentioned shafts, a bracket having a base portion vertically adjustably mounted upon one of the side members, the said bracket having a supporting portion extending inwardly from the base portion to a point substantially midway of the length of the receiving feed rolls and between the same and the delivery feed rolls, a knife comprising side members operatively secured to and supported by the inner end of the said supporting portion, and a blade clamped between the said side members with its operating portion extending upwardly from the said side members, the upper portion of the side members forming jointly a forwardly projecting deflector of substantially V-shape located above the axis of rotation of the lower receiving feed roll and rearwardly of but adjacent to the central portion of said roll, and means for driving the said rolls.

4. A machine as in claim 3 wherein said upper shafts are received in vertically extending slots formed in said side members, said upper shafts are normally positioned at the lower extremities of said slots, and springs yieldingly retain said upper shafts and rolls carried thereby in association with said lower shafts and rolls carried thereby.

HORACE ZELL STEWART.

REFERENCES CITED

The following references are of record in the file of this patent:

UNITED STATES PATENTS

| Number | Name | Date |
|---|---|---|
| 722,895 | Preston | Mar. 17, 1903 |
| 727,339 | Foster et al. | May 5, 1903 |
| 2,374,466 | Stewart | Apr. 24, 1945 |